(12) United States Patent
Hardin et al.

(10) Patent No.: US 8,557,361 B2
(45) Date of Patent: Oct. 15, 2013

(54) OPTICAL DISC WITH THERMALLY-PRINTABLE SURFACE

(75) Inventors: Yulin Hardin, Hopkinton, MA (US); Stephen Robert Herchen, Plymouth, MA (US); Dana Frederic Schuh, Windham, NH (US); William T. Vetterling, Lexington, MA (US); Michael Armour Young, Natick, MA (US); Stephen J. Telfer, Arlington, MA (US); Chien Liu, Wayland, MA (US)

(73) Assignee: Zink Imaging, Inc., Bedford, MA (US)

( * ) Notice: Subject to any disclaimer, the term of this patent is extended or adjusted under 35 U.S.C. 154(b) by 198 days.

(21) Appl. No.: 13/020,771

(22) Filed: Feb. 3, 2011

(65) Prior Publication Data

US 2011/0189424 A1 Aug. 4, 2011

Related U.S. Application Data

(63) Continuation-in-part of application No. PCT/US2009/004436, filed on Aug. 3, 2009.

(60) Provisional application No. 61/086,146, filed on Aug. 4, 2008, provisional application No. 61/100,243, filed on Sep. 25, 2008.

(51) Int. Cl.
*G11B 7/24* (2013.01)

(52) U.S. Cl.
USPC .... 428/64.1; 428/64.4; 428/64.8; 430/270.14

(58) Field of Classification Search
USPC ..................................... 428/64.4; 430/270.14
See application file for complete search history.

(56) References Cited

U.S. PATENT DOCUMENTS

| | | | |
|---|---|---|---|
| 5,854,175 A | 12/1998 | Deboer et al. | |
| 6,660,452 B2 * | 12/2003 | Iwasaki et al. | 430/270.13 |
| 6,864,907 B2 | 3/2005 | Bronson | |
| 7,294,230 B2 | 11/2007 | Flugge-Berendes et al. | |
| 7,309,518 B2 | 12/2007 | Hay et al. | |
| 2004/0121268 A1 | 6/2004 | Conroy et al. | |
| 2007/0286057 A1 | 12/2007 | Honda et al. | |
| 2008/0063900 A1 | 3/2008 | Wu | |

OTHER PUBLICATIONS

PCT International Search Report and Written Opinion—(PCT/US2009/004436) Date of Mailing Sep. 29, 2009.
Supplementary European Search Report for EP 09 80 5250 dated Nov. 7, 2011.

* cited by examiner

*Primary Examiner* — Elizabeth Mulvaney
(74) *Attorney, Agent, or Firm* — Foley & Lardner LLP; Michel Morency

(57) ABSTRACT

An optical disc is described that bears, on one surface, a plurality of color-forming layers that can form a multicolored image when heated in contact with a thermal print head. The color-forming composition comprises color-forming layers and thermally-insulating spacers and is designed such that warping of the optical disc in conditions of changing temperature and humidity is minimized. The compliance of the color-forming composition is such that intimate contact between the thermal print head and the printable surface of the disc can be maintained as one is translated relative to the other. Methods for assembling such an optical disc are provided.

16 Claims, 12 Drawing Sheets

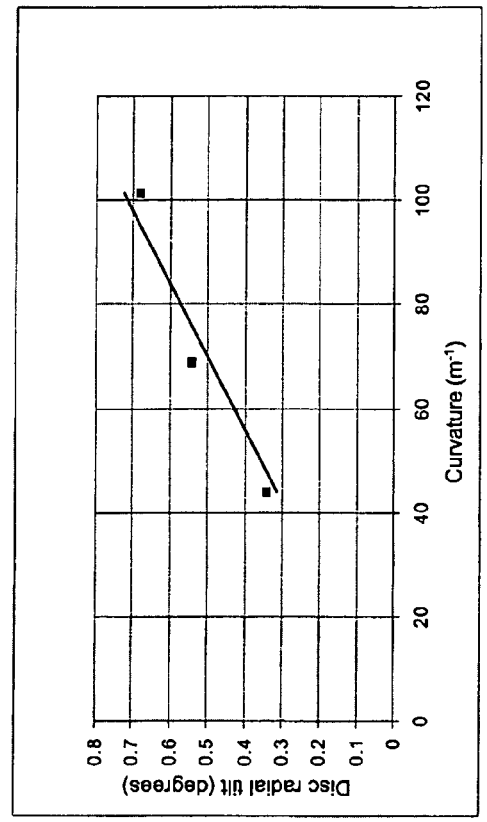
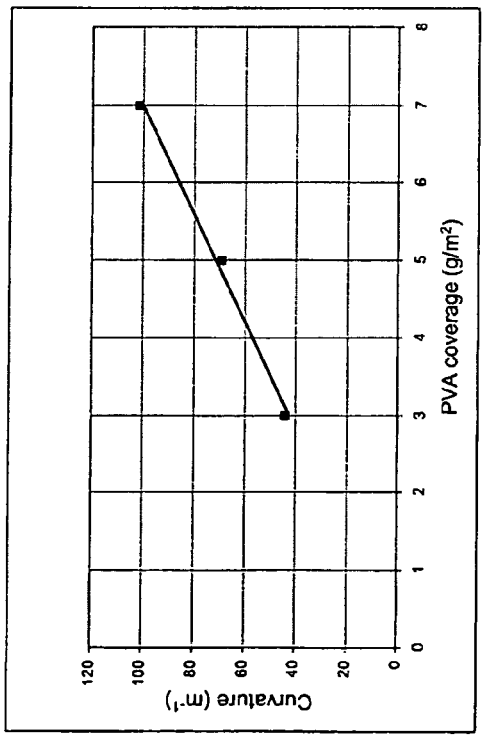
FIG. 6

OPTICAL DISC WITH THERMALLY-PRINTABLE SURFACE

REFERENCE TO RELATED APPLICATIONS

This application is a continuation-in-part application of PCT/US2009/004436 filed Aug. 3, 2009 which claims the benefit of prior provisional patent application Ser. Nos. 61/086,146 filed Aug. 4, 2008 and 61/100,243 filed Sep. 25, 2008, the disclosures of which are hereby incorporated by reference herein in their entirety.

This application is related to the following commonly assigned United States patent applications and patents, the disclosures of all of which are hereby incorporated by reference herein in their entirety:

U.S. Pat. No. 6,801,233 B2 which describes and claims a thermal imaging system for use in the present invention;

U.S. Pat. No. 7,008,759 B2 which describes and claims color-forming compositions for use in the present invention;

U.S. Pat. No. 7,176,161 B2 which describes and claims color-forming compositions for use in the present invention;

U.S. Pat. No. 7,282,317 B2 which describes and claims color-forming compositions for use in the present invention;

U.S. patent application Ser. No. 11/400,734, filed Apr. 6, 2006, which describes and claims an imaging method for use in the present invention;

U.S. Pat. No. 7,408,563, which describes and claims an imaging method for use in the present invention;

U.S. patent application Ser. No. 12/022,955, filed Jan. 30, 2008, entitled "Printhead pulsing techniques for multicolor printers";

U.S. patent application Ser. No. 12/022,969, filed Jan. 30, 2008, entitled "Thermal Imaging Members and Methods";

U.S. patent application Ser. No. 12/343,234, filed Dec. 23, 2008, entitled "Novel Color-forming Compounds and Use Thereof in Imaging Members and Methods"; and U.S. patent application Ser. No. 12/462,421, filed on Aug. 3, 2009, entitled "Thermally-insulating Layers and Direct Thermal Imaging Members Containing Same".

FIELD OF THE INVENTION

The present invention relates generally to an optical disc and, more particularly, to an optical disc bearing on one surface a plurality of thermally-printable image-forming layers; to methods for assembling such an optical disc, and to methods for printing an image on such an optical disc.

BACKGROUND OF THE INVENTION

An optical disc is a data storage medium in the form of a flat, circular structure, typically made out of a transparent plastic material, that incorporates a layer or layers that can be patterned with features that modulate the intensity of laser light reflected from the disc. The optical disc typically comprises a spiral pattern of such features that is addressed by light from a laser diode that is scanned along a radius of the disc as the disc is being rotated. Variations in the intensity of reflected light are detected and interpreted as individual bits. Since the features that can be written and detected may be extremely small, a great deal of data can be stored on an optical disc. Moreover, since optical discs may be cheaply manufactured, they may provide a very competitive cost per bit of data stored in relation to other storage media.

Several generations of optical disc technology have been developed. The compact disc (CD) is read with a near-infrared-emitting laser and stores about 700 MB in a single layer. The DVD is read with a red-emitting laser and stores about 5 GB in a single layer, while a Blu-ray disc is read with a blue-emitting laser and stores about 25 GB in a single layer.

The standard optical disc is a polycarbonate disc of 120 mm diameter, but many other formats have been produced. Single-layer discs have one reading/recording face of high optical quality that is addressed by a laser, while the opposing face may be opaque and is available for labeling the disc.

Recordable and re-writable optical discs are widely available, but have the problem that it may be difficult for a user to label the disc with annotation of what has been recorded. A common practice has been to write onto the surface of the disc with a pen, but this may lead to a perception of a low quality. Several different approaches have been developed for high-quality labeling of a recordable optical disc with customized information, but all have some drawbacks. For example, it is possible to print a label (using, for example, an ink-jet printer) onto a substrate having a sticky back, and to append this label to the optical disc. There is a possibility, in this case, of applying the label eccentrically and unbalancing the disc, leading to problems in reading back the data. It is even possible that the label may be inadvertently applied to the wrong disc. Alternatively, as described in U.S. Pat. No. 7,036,131, an ink-jet printer may be built into the optical drive itself, and the disc may be pre-coated with an ink-receiving layer. In this case, however, the optical drive must be enlarged substantially so as to accommodate the ink-jet printer and ink supplies. An alternative approach is described in U.S. Pat. No. 6,864,907, in which there is described a method by which a thermally-sensitive layer is provided on the optical disc. After writing information to the optical recording surface, the disc is flipped over and re-inserted into the optical drive, whereupon the laser may be used to label the disc by activating the thermally-sensitive layer. This method has the disadvantage that the laser power in optical drives is quite low, and that therefore the time required to write the label may be on the order of several minutes. In addition, full-color printing may be difficult to achieve. U.S. Patent Application No. 2008-0111877 describes an optical disc bearing a full-color label intended for laser exposure. In this case a more powerful laser than is required for writing or reading information onto the data-storage layer or layers of this disc may be used, but such lasers may have prohibitive cost for use in consumer devices.

There therefore remains a need for a method of labeling an optical disc that does not require affixing a label to the disc, and that overcomes the above-mentioned disadvantages with existing integrated disc/label systems.

SUMMARY OF THE INVENTION

It is therefore an object of this invention to provide an optical disc bearing, on one surface, a plurality of color-forming layers that can form a multicolored image when heated in contact with a thermal print head.

In one embodiment, an optical data storage medium includes (A) a laminar plastic disc having first and second opposed surfaces, the plastic disc includes at least one data-storing layer, and (B) a color-forming composition overlying the first surface. The color-forming composition includes, in order of increasing distance from the first surface, a first color-forming layer, a first thermally-insulating layer, a second color-forming layer, a second thermally-insulating layer, and a third color-forming layer. The color-forming layers are initially colorless and form a color when heated, wherein the color-forming temperature of the first color-forming layer is lower than the color-forming temperature of said second color-forming layer, and the color-forming temperature of the second color-forming layer is lower than the color-forming temperature of the third color-forming layer.

The color forming composition is configured to maintain a change in radial tilt of the optical disc measured at any location of less than 0.6 degrees when the ambient humidity changes from 75% RH to 10% RH at a constant temperature between 20° C. and 30° C. or the temperature changes from 20° C. to 80° C. at a constant dew point.

In some embodiments, the optical disc has a stiffness that when measured by applying a force to a recumbent cylindrical probe of 2 millimeter radius in contact with the surface of the color-forming composition at a load of 0.4+/−0.04 Newtons per millimeter of contact, with a compression rate of 1 micrometer per second, is not more than 0.12 Newtons per millimeter of contact per micrometer of penetration when the second surface of the optical disc is rigidly supported.

In another embodiment, a process for manufacture of an optical disc with one thermally-printable surface, includes providing a laminar plastic disc having first and second opposed surfaces, the plastic disc comprising at least one data-storing layer. A thermally-printable composition is coated onto a surface of a web having first and second opposed surfaces. The surface of said thermally-printable composition that is not in contact with said substrate is bonded to said first surface of said plastic disc, and the substrate is removed by peeling. In another embodiment, the thermally-printable composition is bonded to the disc by an adhesive.

BRIEF DESCRIPTION OF THE DRAWINGS

FIG. 2 (not to scale) is a partially schematic, side sectional view of an optical disc bearing a plurality of image-forming and associated layers according to the invention;

FIGS. 5 and 6 are graphs showing the amount of radial tilt induced in optical discs bearing labels of the present invention upon dehydration;

DESCRIPTION OF THE PREFERRED EMBODIMENTS

Figure 1:
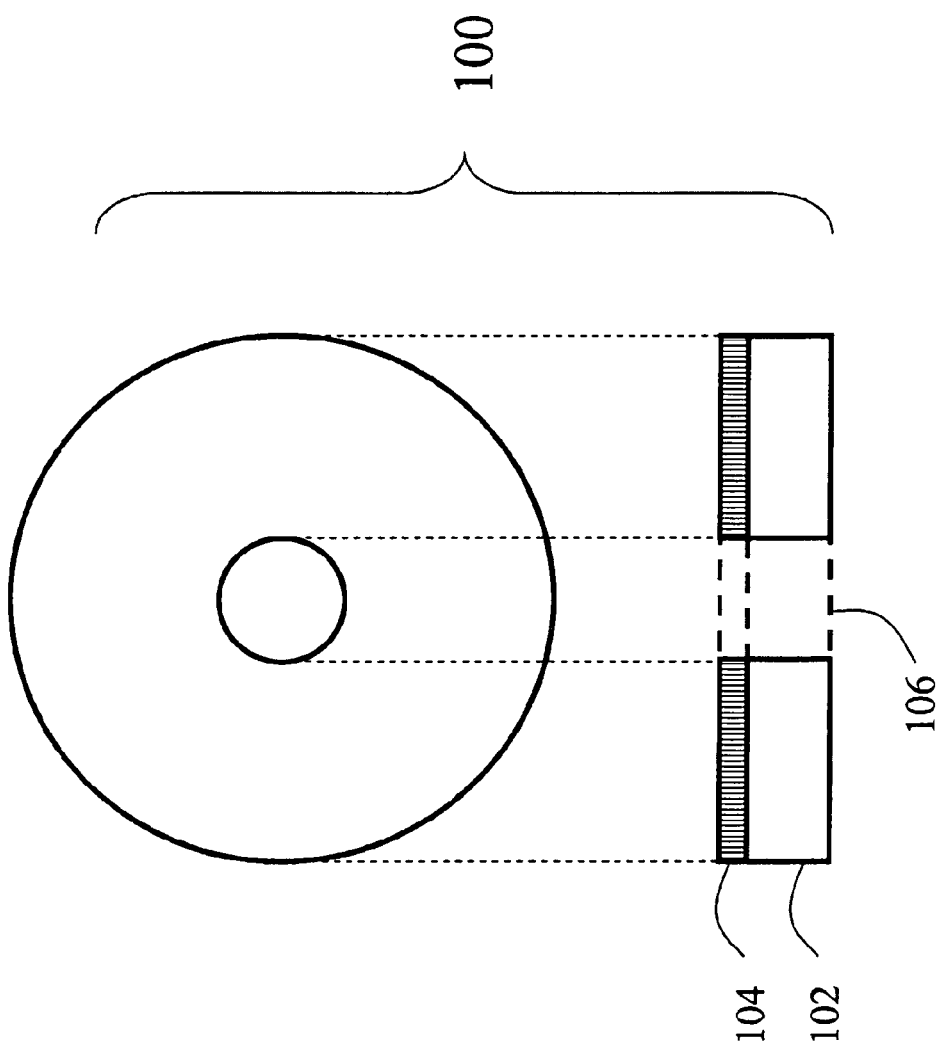
FIG. 1 (not to scale) shows partially schematic plan and side sectional views of an optical disc bearing a thermally-printable coating according to the invention.

Referring now to FIG. 1, there is seen an optical disc 100 of the present invention that comprises a transparent plastic annulus 102 in which is embedded a layer or layers that may be read by a laser (and, optionally, written or rewritten by the same or a different laser). Annulus 102 may be, for example, a CD, DVD or Blu-ray disc. The annulus bears on one surface a composition 104 (that may extend over a part or all of the surface of the annulus) that is thermally sensitive and may be printed by use of a thermal print head. In the cross-sectional view of optical disc 100 is seen a region 106 that corresponds to the center hole of the disc, used for mounting the disc to a spindle.

As used herein, the term "thermal print head" refers to a structure that comprises an array of heating elements (also referred to herein as "print head elements") that makes contact with a thermal imaging composition (also referred to hereinafter as the "thermal printing medium") and produces an image by heating it and effecting a change in, for example, color, reflectivity, opacity, or any property that is discernible by the human eye. The thermal print head may also include a support and driving circuitry, as described in detail in U.S. patent application Ser. No. 12/022,955.

Each of the print head elements, when activated, forms color on the thermal printing medium passing underneath the print head element, creating a spot having a particular optical density in each primary color (hereinafter the term "density" refers to "optical density" unless otherwise specified). Regions with larger or denser spots are perceived as darker than regions with smaller or less dense spots. Digital images are rendered as two-dimensional arrays of very small and closely-spaced spots.

A thermal print head element is activated by providing it with energy. The density of the output produced by the print head element in this manner is a function of the amount of energy provided to the print head element. The amount of energy provided to the print head element may be varied by, for example, varying the amount of power supplied to the print head element within a particular time interval or by providing power to the print head element for a longer or shorter time interval.

As described in U.S. Pat. No. 6,951,952, there have been developed multicolor direct thermal imaging media in which a plurality of colors may be printed by a single thermal print head in a single printing pass. In preferred embodiments of the present invention, image-forming layers such as are described in U.S. Pat. No. 6,951,952 are disposed on a surface of an optical disc, and these layers are addressed by a thermal print head to form a multicolored image on the surface of the disc.

Referring now to FIG. 2, there is seen an optical disc 102 that bears on one surface three color-forming layers 204, 208, and 212, that may form cyan, magenta and yellow, respectively; thermally-insulating layers 206 and 210; and an overcoat layer 214. Separating color-forming composition 200 (comprising layers 204-214) from the surface of optical disc 102 is a bonding composition 202 that may comprise one or more layers as described in more detail below.

Each color-forming layer changes color, e.g., from initially colorless to colored (although this is not a limitation of the present invention) when heated to a particular temperature referred to herein as its activating temperature. The activating temperatures of color-forming layers 204, 208, and 212 are in the order 212>208>204. As described in detail in U.S. Pat. No. 6,801,233, addressing (i.e., heating to above its activating temperature) layer 204 is achieved by heating the surface of the overcoat 214 to a relatively low temperature for a relatively long time; addressing layer 208 is achieved by heating the surface of the overcoat 214 to an intermediate temperature for an intermediate length of time; and addressing layer 212 is achieved by heating the surface of the overcoat 214 to a relatively high temperature for a relatively short time.

Any color order of the color-forming layers can be chosen. One preferred color order is as described above. Another preferred color order is one in which the three color-forming layers 204, 208, and 212 are yellow, cyan and magenta, respectively.

The function of the thermally-insulating layers is control of thermal diffusion. Thermally-insulating layer 210 is preferably thinner than thermally-insulating layer 206, provided that the materials comprising both layers have substantially the same thermal diffusivity. Preferably, in such a case, thermally-insulating layer 206 is at least three times thicker than thermally-insulating layer 210. In general, the square of the thickness of thermally-insulating layer 206 divided by its thermal diffusivity (a quantity that relates to the time required for heat to diffuse through the layer) should be at least four times greater than the square of the thickness of thermally-insulating layer 210 divided by its thermal diffusivity. The structure and function of thermally-insulating layers is discussed in detail in U.S. patent application Ser. No. 12/462,421, filed on Aug. 3, 2009, entitled "Thermally-insulating Layers and Direct Thermal Imaging Members Containing Same".

Although seven layers are shown disposed on the optical disc in FIG. 2, additional barrier layers may be incorporated for example to protect the image from atmospheric oxygen, ultraviolet radiation, or to prevent diffusion of chemicals between the layers. The presence or absence of such layers does not affect the methods or devices of the present invention.

The layers 204-214 are preferably substantially translucent before color formation. When layer or layers 202 comprise a white, reflective material (as described in more detail below) the colored image formed in layers 204, 208 and 212 is viewed through the overcoat 214 against the a white background. The translucency of the layers 204-214 ensures that the colors printed in each of the color-forming layers may be viewed in combination.

During a single pass of the optical disc 100 past the thermal print head, precise control of the amplitude and duration of the power supplied to the print head elements allows any combination of colors to be formed in the three color-forming layers 204, 208 and 212. In this way, a full-color image may be printed in a single pass of the thermal print head. A complete description of this process may be found in U.S. patent application Ser. No. 12/022,955.

In a typical embodiment of the present invention, the optical disc is translated at a speed of 0.1 inch/second relative to the thermal print head, and the image resolution in the transport direction is on the order of 150-600 dots per inch (dpi). The time taken to print one line is therefore on the order of tens of milliseconds.

It will be appreciated that thermal accumulation within the thermal print head, the color-forming composition and associated materials, and the optical disc itself during the course of printing may affect the amount of energy that must be supplied by a given print head element to print a given color. Failure to correct for the effects of thermal history may result in an incorrect color being printed or lead to an error in the printed density of a particular color. Thermal history compensation may be effected in the practice of the present invention as described, for example, in U.S. Pat. No. 7,298,387.

Because color-forming composition 200 is thermally sensitive, it may be marked by use of a heated "stamper" or stylus. In this way a customized logo, or a barcode to encode the printing characteristics of the composition, may be added to the disc during (or after) the manufacturing process. Preferably such a stamping procedure should use the lowest possible temperature, to avoid damaging the surface of the color-forming composition.

Figure 3B:
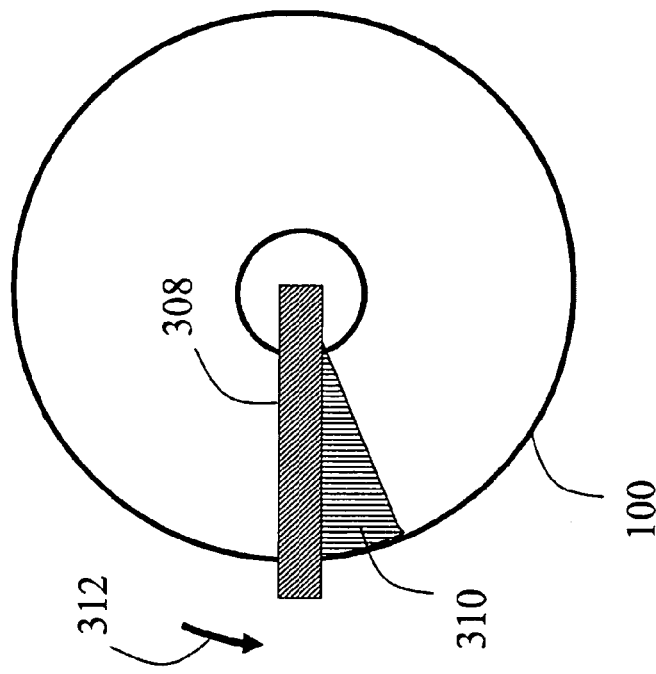
FIG. 3 (not to scale) shows partially schematic, plan views of printing devices according to the invention.
Figure 3A:
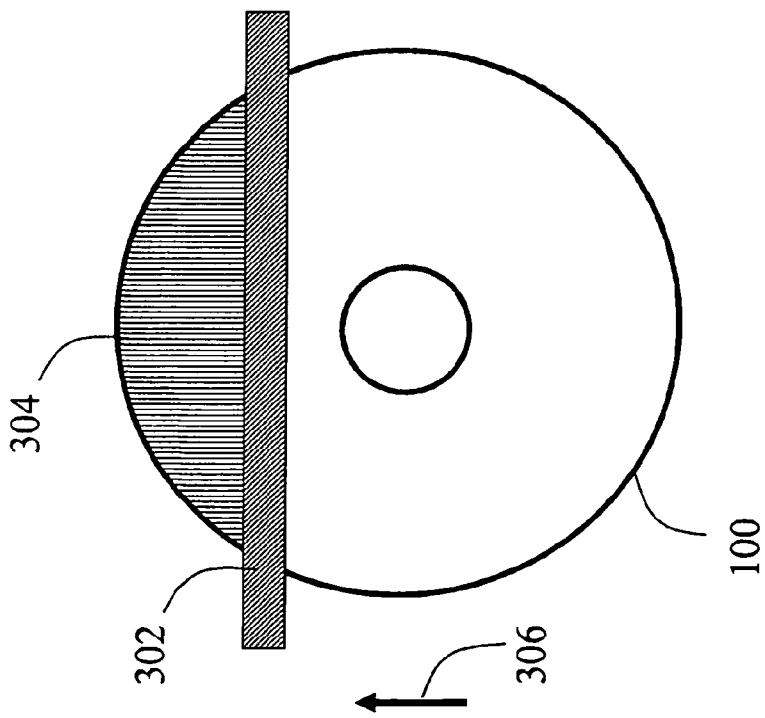

FIG. 3 shows two basic geometric arrangements that allow for translation of the optical disc of the present invention relative to the thermal print head. In FIG. 3a the optical disc 100 is shown being transported in the direction of arrow 306 beneath the thermal print head 302. The printed image 304 is obtained by heating the surface of optical disc 100 as described above. In FIG. 3b the optical disc is rotated in the direction of arrow 312 relative to the thermal print head 308, to form image 310.

Although a single thermal print head is shown in FIG. 3, it will be appreciated that a plurality of thermal print heads may be used. It will also be appreciated that the thermal print head may be moved while the disc is held stationary with respect to the frame of the printing device, or that both the disc and the thermal print head may be moved.

The printing of the disc may be in one or more than one pass of the thermal print head, and these passes may be in the same or different directions of relative motion of the disc or the thermal print head.

It will be clear to one of skill in the art that the image to be printed may cover all or some of the surface of the annular region of the disc that bears the color-forming compositions. The data to be sent to the thermal print head may be such that the print head elements that are not in contact with the surface of the optical disc are not supplied with energy (for example, as the thermal print head traverses the "hole" in the middle of the disc in FIG. 3a). In this way, overheating of the elements may be avoided.

It will be clear to one of ordinary skill in the art that the pressure between the thermal print head and the optical disc will depend upon the length of the line of contact between the two. It may be necessary, in the practice of the present invention, to modulate the force that holds the thermal print head in contact with the surface of the optical disc as printing progresses, in order to maintain as constant a pressure as possible.

The means of transport of the optical disc (or the thermal printing head) may be any means that is typically used in the art of printing, including use of a friction drive comprising elements such as belts or rollers, or a lead screw, a rotating spindle or rotating wheels in contact with the rim of the optical disc.

It will be clear to one of ordinary skill in the art that in the arrangement of FIG. 3b the heating elements that make contact close to the perimeter of the disc will travel faster relative to the surface of the disc than those near the center of the disc as it is rotated. The timing of heating pulses must be adjusted accordingly in order to form an image that does not show a radial gradation. It is not necessary that the entire radius be printed in a single rotation; rather, the image may be printed in concentric or overlapping bands, or in a helical pattern, for example.

Figure 4:
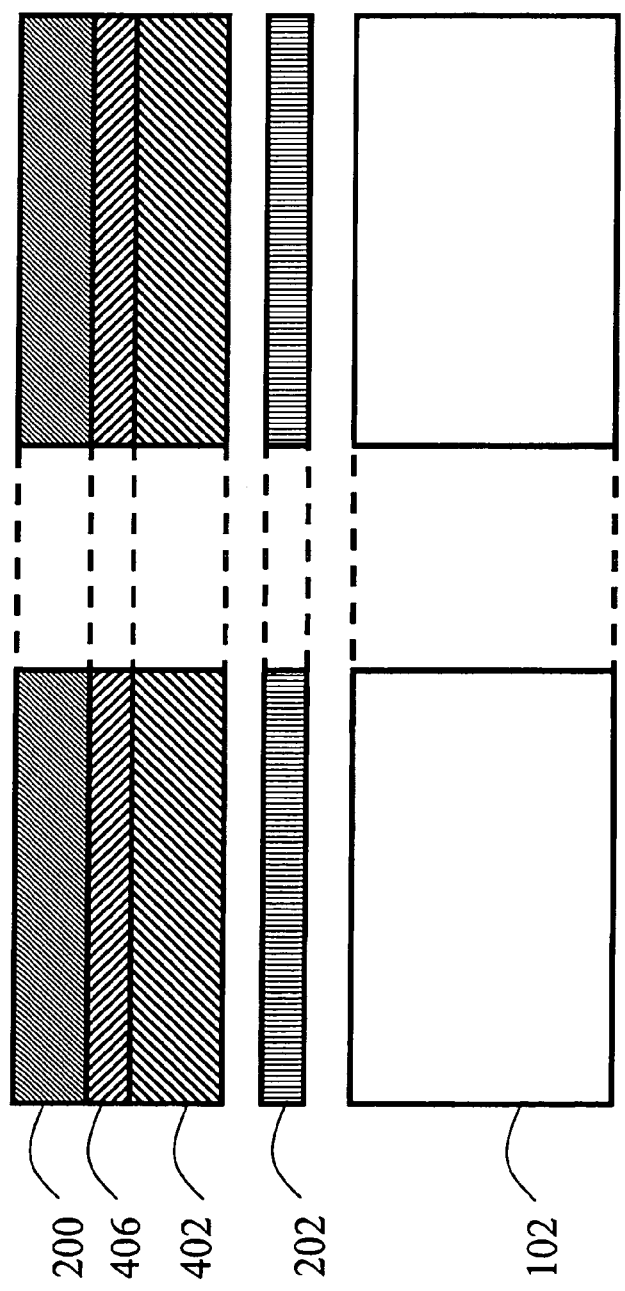
FIG. 4 (not to scale) is a partially schematic, side sectional view of an optical disc to which has been bonded a substrate bearing a plurality of image-forming layers according to the invention.

The optical disc of the present invention may be assembled in several ways. As shown in FIG. 4, the color-forming composition 200 (comprising, as noted above, layers such as 204-214 shown in FIG. 2) may be coated onto a substrate 402, and this substrate may be bonded to optical disc 102 with an adhesive 202.

The substrate 402 may be white or transparent. In the case where substrate 402 is transparent, a white reflective surface may be provided by using a white adhesive 202 or by supplying an additional white layer (not shown) on the surface of optical disc 102.

Also shown in FIG. 4 is an optional compliant layer 406 as described in more detail below. Layer 406 may also, or alternatively, provide thermal insulation between the color-forming composition 200 and the substrate 402.

The choice of substrate 402 is important in the practice of the present invention. In order that data be reliably written to and read from an optical disc, it is critical that the disc be as flat as possible. This is because the disc is read by detecting light that is reflected from very small regions of the surface of the disc. If the disc itself is warped, the reflected light that is detected may come from an unintended region of the disc, and result in the wrong bit being read. The same argument applies to the writing of data to the disc.

As the disc is rotated, two types of warping may be manifested. In the first type of warping, hereinafter referred to as "radial tilt", the disc is warped in a way that maintains rotational symmetry about its rotational axis but that forms a "bowl" shape. Radial tilt may result if the substrate 402 shrinks or expands isotropically with respect to the disc. The disc will warp towards the label face if the substrate 402 shrinks relative to the disc, and towards the optical read/write face if substrate 402 expands relative to the disc.

The second type of disc warp is hereinafter referred to as "tangential warp". In this case, the disc may be bent around an axis or axes that is/are parallel to the plane of the disc, to form cylindrical, saddle-shaped, or even more contorted geometries. Such shapes may arise if the substrate 402 changes dimensions in an oriented (i.e., non-isotropic) fashion.

Shrinkage or expansion of substrate 402 may be induced, for example, by heating, cooling, hydration, dehydration, oxidation, photolysis, or other means. Under any use condition of the optical disc, it is vital that such dimensional change not lead to warping of the optical disc beyond the point that the data can be reliably written and read back. In the case of Blu-ray discs, for example, radial tilt cannot exceed +/−0.3 degrees and the tangential warp cannot exceed +/−0.15 degrees.

The radial tilt and tangential warp may be measured by methods that are known in the art, for example, by reflecting a laser off a surface of the optical disc and measuring the deflection of the beam. Typically, the radial tilt increases with increasing distance from the axis of rotation of the disc. There are also cases where radial tilt may change sign (i.e., direction with respect to the plane of the disc) with increasing radius.

In one preferred embodiment of the present invention there is provided an optical disc bearing on one surface a color-forming composition according to the invention wherein the change in radial tilt measured at any location is less than 0.6 degrees when the ambient humidity changes from 75% RH to 10% RH at a constant temperature between 20° C. and 30° C.

In another preferred embodiment there is provided an optical disc bearing on one surface a color-forming composition according to the invention wherein the change in radial tilt measured at any location is less than 0.6 degrees when the temperature changes from 20° C. to 80° C. at a constant dew point.

Temperatures as high as 80° C. may be encountered in an optical disc drive incorporating a thermal printing head, particularly when such a drive is embedded in another device such as a display or a computer.

The present inventors have found that for use in the present invention the substrate should change by no more than 0.05% in any linear dimension when heated at 90° C. for 24 hours. Preferred substrates for use in the present invention include polyimide, polyetherimide and polysulfone. An especially preferred substrate is polycarbonate.

As described in more detail below, in one embodiment of the present invention substrate 402 is absent, and the color-forming composition 200 is bonded directly to the adhesive 202.

As described above, it is important that the substrate 402 used in some embodiments of the present invention be chosen so as not to warp the disc under any operating condition. Likewise, it is necessary that the color-forming composition 200 itself not exhibit dimensional changes that lead to warping of the disc.

U.S. patent application Ser. No. 11/400,734 describes an aqueous-coatable thermal imaging composition comprising three color-forming layers and a plurality of barrier layers. As described therein, the color-forming layers and barrier layers may comprise hydrophilic, water-soluble polymers such as poly(vinyl alcohol) (PVA), ethylene vinyl alcohol, gelatin, polyacrylamide, hydroxyethylcellulose, starch, and the like. Such materials, even when cross-linked, are known to absorb water in humid environments and to lose water in dry environments. Such changes in hydration may lead to significant dimensional changes. The present inventors have found that, in certain preferred embodiments of the present invention, the amounts of such hydrophilic, water-soluble polymers incorporated into color-forming composition 200 should be minimized.

Figure 5:
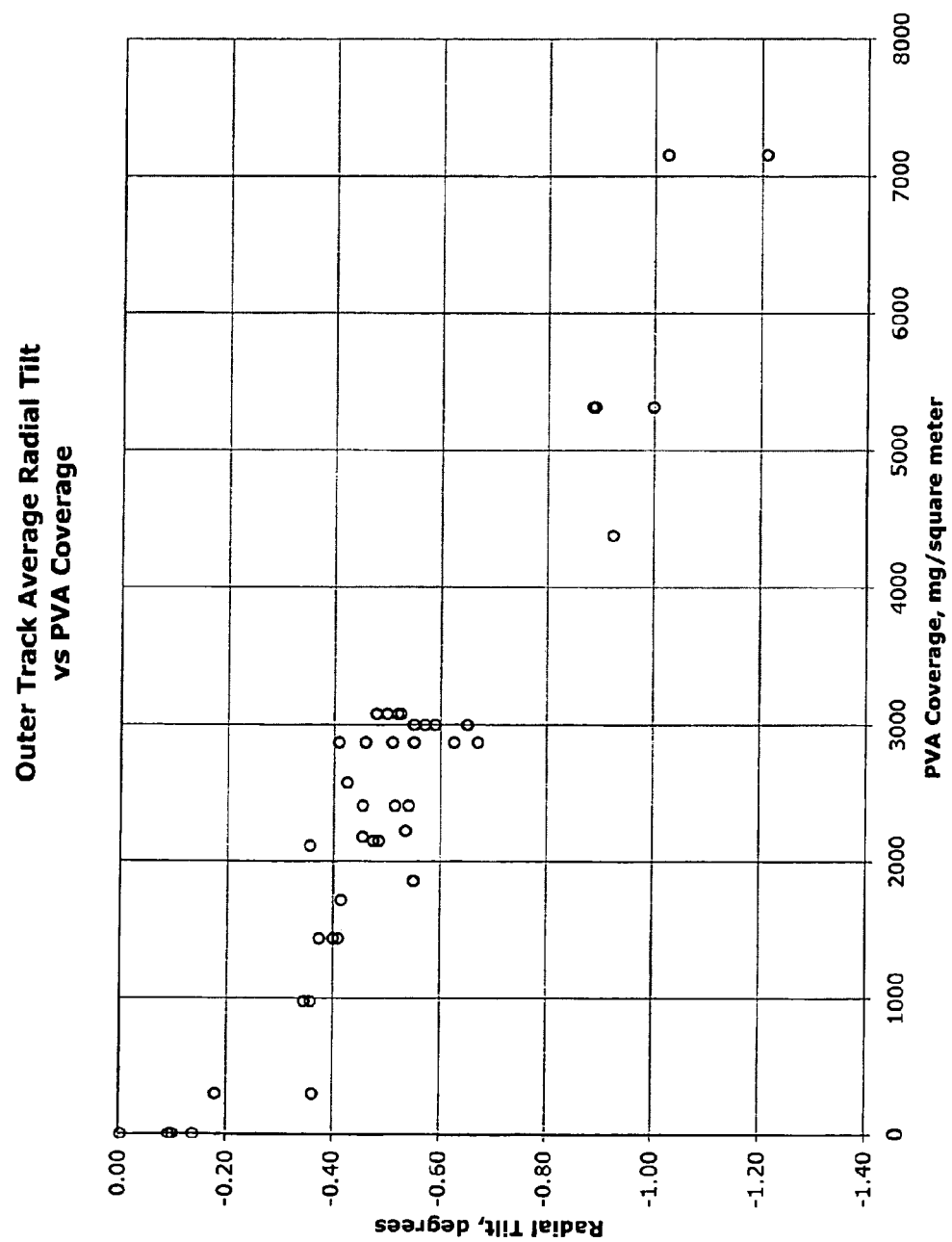

FIG. 5 shows the amount of radial tilt that is induced in Blu-ray discs bearing a variety of color-forming compositions of the present invention when placed overnight in a dry environment (5-10% RH at 20-25 C) after equilibration at an ambient condition of ~50% RH at the same temperature. As can be seen in FIG. 5, the amount of radial tilt induced in the discs is approximately proportional to the amount of a hydrophilic, water-soluble polymer (PVA) that is incorporated into the color-forming composition 200. As mentioned above, for a Blu-ray disc the limit of radial tilt is +/−0.3 degrees (i.e., the total range is a change in radial tilt of 0.6 degrees). The complete budget of 0.6 degrees is available if the disc is appropriately biased, as discussed in more detail below). It is apparent from FIG. 5, however, that there is a great deal of variation associated with the degree of warp observed for a given coverage of PVA.

In many instances the environment within which a water-soluble polymer is located may profoundly affect the curl force that is exerted when the water-soluble polymer is dehydrated. Although it might appear from FIG. 5 that no more than about 3 g/m$^2$ of a hydrophilic, water-soluble polymer can be tolerated if the total budget of +/−0.3 degrees of radial tilt is to be met, in fact if the Young's modulus of the material within which such a polymer is incorporated is sufficiently low, greater amounts of such polymers may be used in the practice of the present invention.

It is possible to predict the amount of radial tilt that will occur when an optical disc labeled with color-forming composition 200 of the present invention is subjected to changing humidity by measuring the curvature that is induced in color-forming composition 200 itself when it undergoes the same change in humidity. FIG. 6A shows the curvature that develops when coatings of a PVA grade POVAL MP103 (available from Kuraray America, Houston, Tex.) are applied to a filled, white polycarbonate base of 62.5 microns thickness when the coatings are first equilibrated at 25° C. and 75% RH (at which point they are flat) and then desiccated at approximately 25° C. and 8% RH. It can be seen that the curvature increases linearly with the coverage of the PVA polymer.

The amounts of radial tilt induced in optical discs to which the abovementioned coatings of POVAL MP103 on polycarbonate had been affixed by means of a pressure-sensitive adhesive (8171, available from 3M Corporation, St. Paul, Minn.) were measured when the disc assembly underwent the same changes in humidity as described above for the coatings themselves. FIG. 6B shows that the amount of radial tilt is roughly proportional to the curvature measured in the simple coating. It can be seen that the maximum amount of curvature in the coating on 62.5 micron polycarbonate to stay within the total radial tilt budget of 0.6 degrees is about 80 m$^{-1}$, and about 40 m$^{-1}$ is required to stay within the limit of 0.3 degrees that would be the case for an unbiased disc. It will be evident that coatings of identical color-forming compositions 200 onto substrates differing in composition and/or thickness from the 62.5 micron polycarbonate discussed above will exhibit different amounts of curvature than the preferred quoted values. Mechanical modeling suggests that the amount of curvature tolerable for polycarbonate substrates of 50 microns thickness to stay within the total radial tilt budget of 0.6 degrees is about 120 m$^{-1}$, and about 60 m$^{-1}$ is required to stay within the limit of 0.3 degrees.

Preferred color-forming compositions 200 of the present invention, when affixed to polycarbonate base of 62.5 microns in thickness, exhibit curvature of not more than 80 m$^{-1}$, especially preferably not more than 40 m$^{-1}$.

Preferred color-forming compositions 200 of the present invention, when affixed to polycarbonate base of 50 microns in thickness, exhibit curvature of not more than 120 m$^{-1}$, especially preferably not more than 60 m$^{-1}$.

A preferred color-forming composition 200 for use in the present invention will now be described in detail.

All layers are coated from aqueous fluids which contain small amounts of a coating aid, Zonyl FSN, available from Dupont Co., Wilmington, Del.

Figure 7:
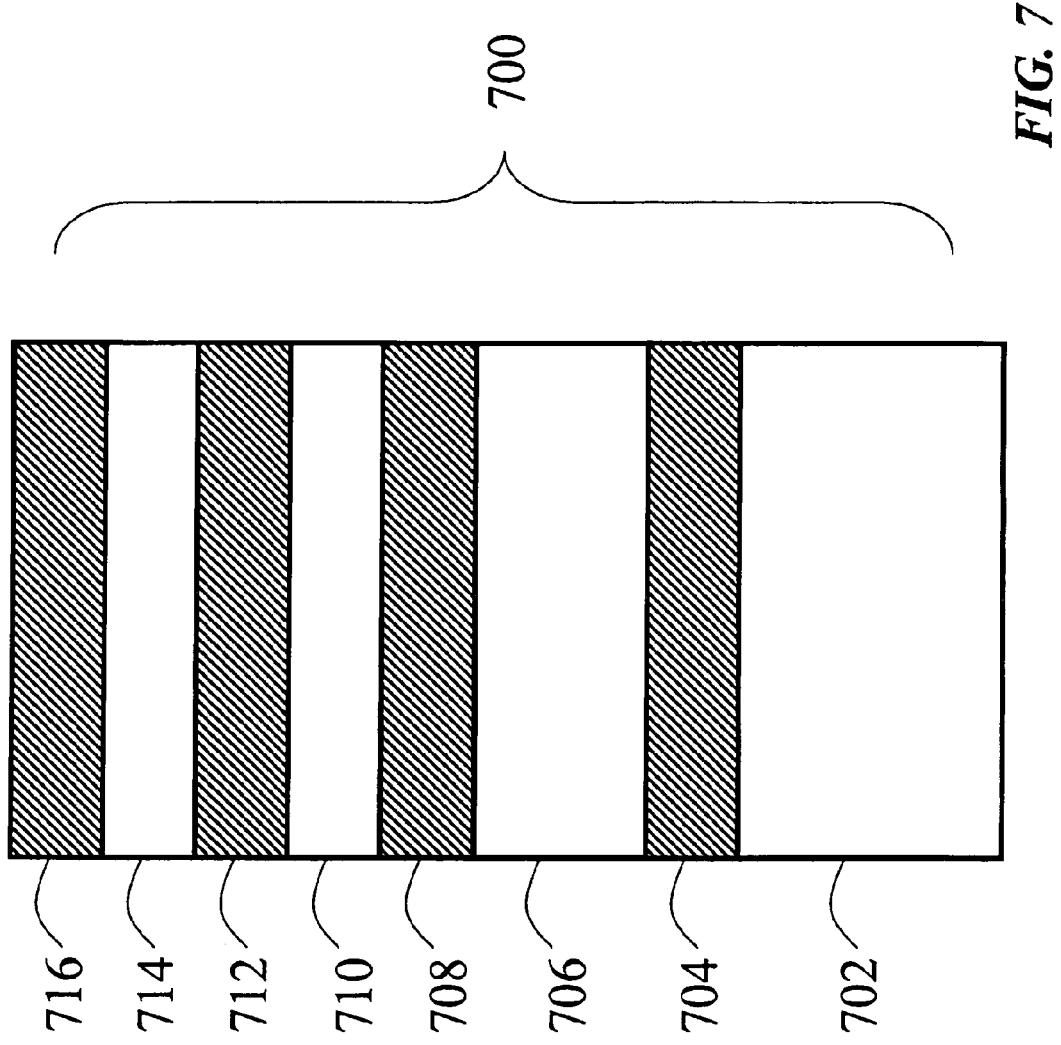
FIG. 7 (not to scale) is a partially schematic, side sectional view of a preferred color-forming composition according to the invention.

Referring now to FIG. 7, the substrate 702 is a filled, white polycarbonate having thickness 50 microns.

Color-forming layer 704 may be in direct contact with substrate 702 as shown in FIG. 7, or there may be optional intervening adhesion-promoting or oxygen barrier layers (not shown). Layer 704 is composed of a cyan color-forming compound, Dye X of copending U.S. patent application Ser. No. 12/022,969 (7.72% by weight), 1,4-bis(benzyloxy)benzene (a thermal solvent having melting point 125° C., coated as an aqueous dispersion of crystals having average particle size under 1 micron, 48.6% by weight), a phenolic antioxidant/developer (Anox 29, having melting point 161-164° C., available from Chemtura, Middlebury, Conn., coated as an aqueous dispersion of crystals having average particle size under 1 micron, 7.91% by weight), Lowinox 1790 (a second phenolic antioxidant/stabilizer, available from Chemtura, Middlebury, Conn., coated as an aqueous dispersion of crystals having average particle size under 1 micron, 13.28% by weight), and a binder (a water-borne latex, CP655, available from Dow Chemical Co., Midland, Mich., 22.31% by weight). This layer has a coverage of 2.53 g/m$^2$.

Overlying the cyan color-forming layer 704 is a thermally-insulating layer 706 composed of the above-mentioned CP655 (69.9% by weight), the above-mentioned Lowinox 1790 (coated as an aqueous dispersion of crystals having average particle size under 1 micron, the dispersant of which is a styrene-maleic acid copolymer, SMA 1000MA, available from Sartomer Company, Inc., Exton, Pa., 14.25% by weight), a hydrophobically-modified, fully-hydrolyzed grade of poly(vinyl alcohol) POVAL MP103, available from Kuraray America, Inc., Houston, Tex. (13.5% by weight), an aziridine crosslinker, CX-100, available from DSM NeoResins, Waalwijk, The Netherlands, 1.7% by weight, and a surfactant, Alkanol OS, available from E. I. DuPont de Nemours, Wilmington, Del., 0.3% by weight. This layer has a coverage of 12 g/m$^2$.

Overlying the thermally-insulating layer 706 is a magenta color-forming layer 708, composed of a magenta color-former, Dye 23 described in copending U.S. patent application Ser. No. 12/343,234, 8.93% by weight; a phenolic ether thermal solvent, 1,4-bis[(4-methylphenoxy)methyl]benzene, (melting point 172° C., coated as an aqueous dispersion of crystals having average particle size under 1 micron, 46.74% by weight); a phenolic antioxidant/developer (Lowinox 44B25, having melting point 210-211° C., available from Chemtura, Middlebury, Conn., coated as an aqueous dispersion of crystals having average particle size under 1 micron, 18.26% by weight); a second phenolic antioxidant/stabilizer (Lowinox 1790, available from Chemtura, Middlebury, Conn., coated as an aqueous dispersion of crystals having average particle size under 1 micron, 5.13% by weight); and a binder (poly(vinyl alcohol)), Celvol 540, available from Celanese, Dallas, Tex., 20.39% by weight). This layer has a coverage of 2.56 g/m$^2$.

Overlying the magenta color-forming layer 708 is a second thermally-insulating layer 710, having the same composition as thermally-insulating layer 706. This layer has a coverage of 3 g/m$^2$.

Overlying the second thermally-insulating layer 710 is a yellow color-forming layer 712 composed of a yellow color-former (Dye XI described in U.S. Pat. No. 7,279,264, having melting point 202-203° C.), 61.3% by weight, a phenolic antioxidant/stabilizer (Lowinox 1790, available from Chemtura, Middlebury, Conn., coated as an aqueous dispersion of crystals having average particle size under 1 micron, 6.13% by weight), a rheology modifier, the above-mentioned POVAL MP103, 10% by weight, and a binder, Carboset CR717 (a latex available from Lubrizol, Cleveland, Ohio, 22.26% by weight). This layer has a coverage of 2.05 g/m$^2$.

Deposited on the yellow color-forming layer 712 is an ultra-violet blocking layer 714 composed of a nanoparticulate grade of titanium dioxide (MS-7, available from Kobo Products Inc., South Plainfield, N.J., 62% by weight), the above-mentioned POVAL MP103 (35% by weight) and glyoxal (3% by weight). This layer has a coverage of 2 g/m$^2$.

Deposited on the ultra-violet blocking layer 714 is an overcoat 716 composed of Carboset 526 (a polymeric binder available from Lubrizol, Cleveland, Ohio, 5 parts by weight), the above-mentioned POVAL MP103 (2.12 parts by weight), NeoRez R-989 (a polyurethane latex, available from DSM NeoResins, Waalwijk, the Netherlands, 4.34 parts by weight), Hidorin F-115P (a meltable lubricant, available from Nagase America Corp., New York, N.Y., 5 parts by weight), Pinnacle 2530, a grade of erucamide, available from Lubrizol Advanced Materials, Inc., Cleveland, Ohio, (1 part by weight), and Ultraflon AD-10 (a poly(tetrafluoroethylene) lubricant available from Laurel Products LLC, Elverson, Pa., 1.72 parts by weight). This layer has a coverage of 1.2 g/m$^2$.

When dehydrated, the coating described above exhibited a curvature of 106 m$^{-1}$. Had the coating been made on a polycarbonate substrate of 62.5 microns in thickness, instead of 50 microns in thickness, a mechanical model (assuming the Young's modulus of polycarbonate to be 2.4 GPa) suggests that the curvature would have been 70 m$^{-1}$.

The direction of the radial tilt shown in FIG. 5 is away from the optical read/write face of the disc, and towards the label side, consistent with shrinkage of the hydrophilic, water-soluble polymer upon dehydration. Hydration and swelling of such polymers, however, does not typically warp the disc in the direction away from the label. This is because the uptake of water also plasticizes the hydrophilic polymeric materials, making them less able to exert a bending force. Extreme hydration may reduce their glass transition temperatures (Tg) to below the ambient temperature, at which point they may even be able to flow.

Since dehydration may warp the disc toward the label, but hydration is unlikely to warp the disc away from the label, it is preferred in one embodiment of the present invention that the optical disc 102 on which the color-forming composition 200 is disposed have a starting radial tilt of between 0 and 0.3 degrees in the direction away from the label side. In this way, larger amounts of hydrophilic, water-soluble polymers may be incorporated into the color-forming composition.

As mentioned in reference to FIG. 4 above, in one embodiment of the present invention substrate 402 is absent, and the color-forming composition 200 is bonded directly to the adhesive 202.

Figure 8:
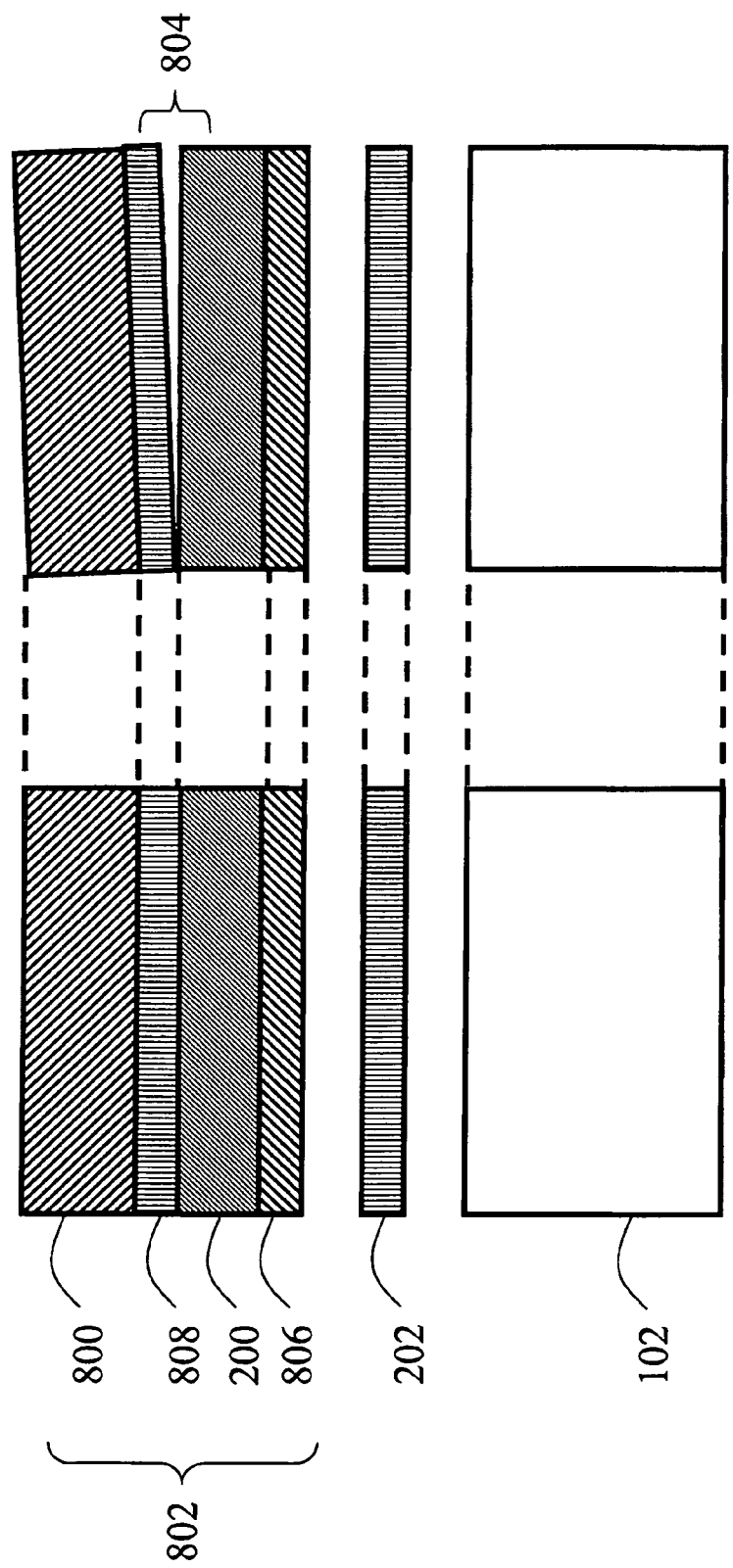
FIG. 8 (not to scale) illustrates in partially schematic, side-sectional view, a method for manufacturing an optical disc of the present invention.

Assembly of the optical disc comprising the color-forming composition 200 but no substrate 402 is achieved as shown in FIG. 8. Color-forming composition 200, comprising layers 204-214, is coated "upside down" on a substrate 800 that bears an optional "release layer" 808 to form transfer laminate 802. The order of color-forming layers coated onto substrate 800 is such that color-forming layer 212 (requiring the highest temperature for coloration) is closest to substrate 800; color-forming layer 208 (requiring the intermediate temperature for coloration) is between color-forming layers 212 and 204; and color-forming layer 204 (requiring the lowest temperature for coloration) is farthest from substrate 800. The transfer laminate 802 is adhered to the surface of optical disc 102 by means of adhesive layer 202, after which substrate 800 is removed (as indicated by "peeling" at numeral 804).

The order of the laminating steps described above is immaterial. Thus, the adhesive 202 may be applied first to the optical disc 102 or first to the transfer laminate 802.

Optionally, an additional layer or layers 806 may be provided on top of color-forming layer 204 in transfer laminate 802 to protect color-forming layer 204 from chemical interaction with adhesive layer 202.

In a preferred method of the present invention a disc is manufactured in steps of coating a thermally-printable composition onto a surface substrate 800, which is preferably a web, bonding the surface of the thermally-printable composition that is not in contact with the substrate 800 to the optical disc 102 and finally removing the substrate by peeling.

Any or all of the color-forming, spacer, barrier or overcoat layers of the color-forming composition 200 of the present invention may be applied to the optical disc itself by spin coating. In the case that all layers 204-214 are applied in this fashion, adhesive layer 202 may not be required.

In one preferred embodiment, the overcoat layer is applied by spin coating to an optical disc that comprises the other required layers of color-forming composition 200, namely, layers 204-212. Optionally, as described in more detail below, the overcoat layer 214 is a UV-curable composition that is applied to the optical disc by spin coating following which the disc is irradiated with ultraviolet light to effect hardening of the overcoat layer 214.

Whichever method for assembly of the optical disc embodiments of the present invention is adopted, the final structure will have the general form illustrated in FIG. 2. There are some further general requirements of this structure for optimal use in the printing methods of the present invention.

Overcoat 214 is in direct contact with the thermal print head during printing, and thus must comprise materials that are thermally resistant. In addition, the coefficient of friction between the thermal print head and the overcoat must be low (below about 0.4 and preferably below 0.3) and as constant as possible whatever the temperature of the thermal print head (as is well known in the thermal printing art). As is known in the art, overcoat 214 may comprise meltable lubricants (such as waxes, metal soaps such as zinc stearate, or crystalline compounds comprising long aliphatic chains), non-meltable lubricants (e.g., fluorine-containing organic materials such as Teflon, silicone materials, graphite, boron nitride), and mild abrasives such as silica.

It is well-known that polycarbonate, from which most optical discs are constructed, absorbs water in moist environments, and expands as it does so. When a disc moves from a moist to a dry environment, water is lost from polycarbonate, leading to a contraction. Therefore, any material that leads to an asymmetry between the rates of uptake or loss of moisture at the two faces of the disc may lead to warping of the disc. This problem is discussed in detail in Joseph Wrobel, "Ramp profiles for optical disc incubation", SPIE Vol. 2338 Optical Data Storage, 191-202, 1994.

Figure 9:
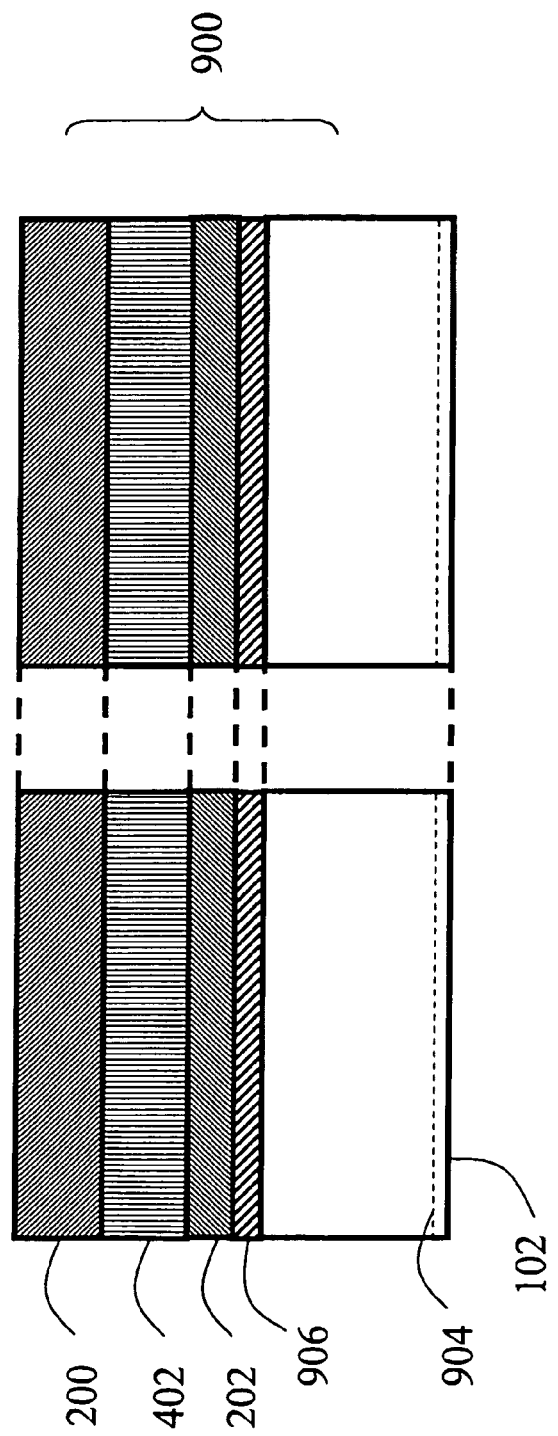
FIG. 9 (not to scale) is a partially schematic side sectional view of two optical discs to each of which has been bonded a moisture barrier layer, a compliant layer and a color-forming composition according to the invention.

Referring now to FIG. 9, there is seen a schematic (not to scale) of a labeled disc 900. Disc 900 comprises a reflective layer 904 that is used for optical recording purposes. Layer 904 is shown as unsymmetrically located within optical disc 102, being closer to the unlabeled face of the disc (the optical read/write face). This is the preferred location of the optical recording layer for use with optics having a high numerical aperture that are used, for example, in reading and writing discs in blue wavelengths (for example, Blu-ray discs). In the case that layer 904 is metallic, it may be a moisture barrier that renders the structure of the disc unsymmetrical with respect to the uptake and loss of water. This situation may be remedied by providing a second moisture-barrier layer 906 close to or on the opposite face of the disc 102 to layer 904, i.e., on the face of the disc to which the color-forming composition 200 of the present invention is affixed through adhesive layer 202 and (optional) substrate 402. Such a moisture barrier layer could be provided by, for example, a sputtered layer of a metal or by other methods that will be familiar to those skilled in the art.

Another requirement for the labeled optical disc of the present invention is that intimate contact be maintained between the surface of the color-forming composition 200 and the thermal print head during printing.

Figure 10:
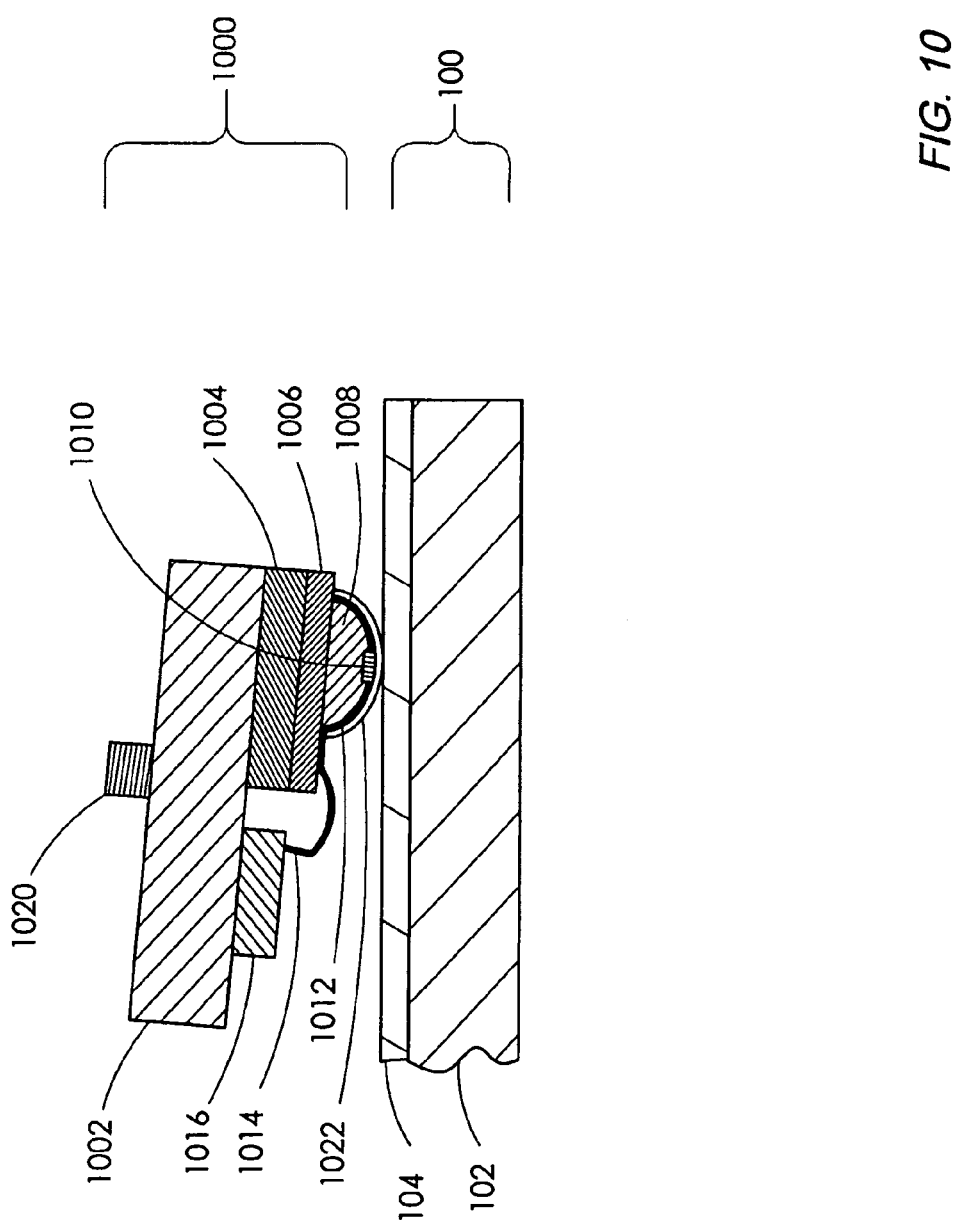
FIG. 10 (not to scale) is a partially schematic, side sectional view showing a thermal print head in contact with an optical disc of the present invention.

Referring now to FIG. 10, there is seen a schematic, cross-sectional view of a typical thermal printing arrangement in which a thermal printing head 1000 and optical disc 100 are held in intimate contact by an applied pressure. As shown in FIG. 1, a typical thermal printing head 1000 comprises a support 1002 that carries both the driving circuitry 1016 and the assembly comprising the heating elements. This support 1002 comprises a heat sink whose temperature is monitored by, for example, thermistor 1020. The heating elements 1010 are carried by a glaze layer 1006 in contact with a ceramic substrate 1004, and covered by a thin, thermally-conductive overcoat (not shown). Ceramic substrate 1004 is in contact with support 1002. In preferred embodiments the heating elements 1010 are located on a cylindrical "glaze bump" 1008. Wires 1014 provide electrical contact between the heating elements 1010 and the driving circuitry 1016 through patterned conductive connections 1012. Heating elements 1010 are in contact with the thermally-sensitive composition 104 through the thin, thermally-conductive overcoat layer. In the arrangement of FIG. 10, control of the amplitude and duration of the electrical power supplied to the heating elements 1010 controls the temperature evolution of the surface of thermally-sensitive composition 104.

Intimate contact between the thermal print head 1000 and the surface of thermally-sensitive composition 104 may be interrupted, for example, by dirt particles on the surface of the thermally-sensitive composition 104 or by slight misalignments between the thermal printing head and the surface of the optical disc. For example, the line of heating elements 1010 on the thermal printing head may not be exactly straight.

Referring now to FIG. 4, in order to maintain intimate contact it is preferred that a compliant layer be provided between the color-forming composition 200 and the optical disc 102 itself. Such compliance may be provided by the adhesive layer 202, and when this is done it is preferred that the substrate 402 be thin enough that it does not itself form a rigid member and prevent the compliance of adhesive layer 202 from alleviating imperfect contact between the thermal print head and the color-forming composition 200. For this reason it is preferred that the substrate 402 be not more than about 75 microns in thickness, and preferably 50 microns or less in thickness. Alternatively, substrate 402 may itself be compliant, comprising, for example, air voids.

The desired degree of compliance is such as to provide a uniform contact width of at least 100 microns across the whole length of the line of heating elements on the thermal printing head. As mentioned above with reference to FIG. 10, in preferred embodiments the heating elements 1010 are located on cylindrical glaze bump 1008. The radius of curvature of glaze bump is typically in the range of 2-3 millimeters and the force applied to the printing head in order to maintain contact with the surface of the disc is typically in the range of 2-6 N/cm, preferably about 4 N/cm.

The compliance of substrates 402 of FIG. 4 bonded to adhesive layers 202 may be measured as follows. Recall that mechanical compliance and stiffness are reciprocals of each other; i.e. stiffness=1/compliance. A compression head comprising two parallel cylinders of 2 millimeter radius and 25.4 millimeter length is loaded onto the test samples at loads up to the approximate printing condition of 0.4 Newtons/millimeter, at rates in the range of 1-100 micrometers/second. Loading a cylinder onto a substrate in a direction parallel to its axis is hereinafter referred to as loading a "recumbent cylinder" or a "recumbent cylindrical probe". The value of stiffness, i.e. load/distance, at a load of 18.95 Newtons is recorded; this value includes a correction for the weight of the compression head. The sample stiffness values are then corrected using the blank value obtained without a sample in the compression instrument by assuming that the sample and blank compliance values are additive. Acceptable printing of optical discs of the present invention can be achieved when the stiffness measured as described above at 1 micrometer/second compression rate is not more than 0.12 N/mm/micrometer.

Therefore, in a preferred embodiment of the present invention, there is provided an optical disc bearing a color-forming composition of the invention wherein the stiffness measured by applying a force to a recumbent cylindrical probe of 2 millimeter radius in contact with the surface of said color-forming composition at a load of 0.4+/−0.04 Newtons per millimeter of contact, with a compression rate of 1 micrometer per second, is not more than 0.12 Newtons per millimeter of contact per micrometer of penetration when the second surface of the optical disc is rigidly supported.

Such a compliance may be achieved in certain embodiments of the present invention when substrate 402 of FIG. 4 is a filled, white polycarbonate base of 62.5 micron thickness or less and adhesive layer 202 is a pressure-sensitive adhesive such as 3M 8172 having a thickness of at least 50 microns.

It may be required for some applications that the total thickness of adhesive 202, substrate 402, optional layer 406 and color-forming composition 200 not exceed a maximum label thickness value. Such a maximum value may be imposed, for example, by the need for the disc to fit within the clamping geometry of existing disc readers. For example, the maximum label thickness value for Blu-ray discs is about 100 micrometers.

In such cases, it may not be possible to provide an adhesive layer 202 having 50 micron thickness. For example, if the total thickness of the color-forming composition of the invention is about 25 microns, and the substrate is of 50 micron thickness, the maximum adhesive thickness would be 25 microns for use on a Blu-ray disc, unless the label does not extend into the clamping region of the disc (which is an annulus around the central hole). It may not be practical to use substrates thinner than about 50 microns because of the difficulty of handling such materials in coating operations.

Table 1 shows the result of a mechanical analysis of applying a load of 0.445 N/mm to a cylindrical probe of radius 2 mm in recumbent contact with a polycarbonate substrate of thickness 50 micrometers and Young's modulus 2.3 GPa, the substrate being attached to the surface of a polycarbonate disc with an adhesive of thickness 25 microns. In this analysis the compression of the color-forming composition is ignored.

TABLE 1

| Adhesive Young's modulus (MPa) | Contact width (m) | Compression (m) |
| --- | --- | --- |
| 1 | 160 | 13.4 |
| 3.3 | 90 | 5.7 |
| 10 | 70 | 2.6 |
| 33 | 60 | 1.2 |
| 100 | 50 | 0.64 |
| 300 | 40 | 0.4 |

It can be seen from Table 1 that for a contact width between the cylindrical probe (which mimics the glaze bump of the thermal print head) and the surface of the substrate of at least 90 microns, the Young's modulus of the adhesive must be less than 3.3 MPa. In this case, the compression of the surface of the substrate will be 5.7 microns, or about 0.08 N/mm/.m.

It will be appreciated by those of ordinary skill in the art that there may be a viscous and an elastic component to the Young's modulus. In the present invention it is preferred that viscous flow be minimized (otherwise the adhesive may be extruded from the edge of the disc during printing). It is therefore preferred that a non-flowing adhesive be used, for example, a highly crosslinked adhesive. Examples of such adhesives include acrylic and silicone materials, although the present invention is not limited thereto.

Figure 11:
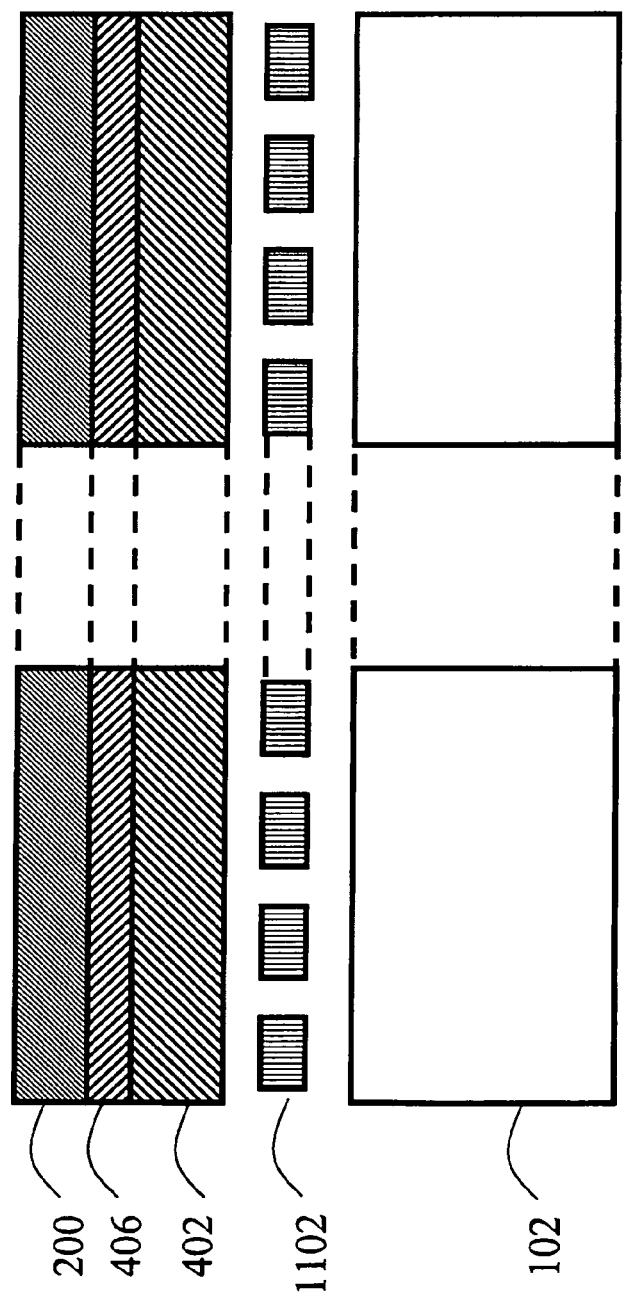
FIGS. 11 and 12 (not to scale) are partially schematic, side sectional views of optical discs to which have been bonded substrates bearing a plurality of image-forming layers according to the invention.

If it is desired to use adhesives with a Young's modulus higher than 3.3 MPa in conjunction with a polycarbonate substrate having 50 microns or greater thickness, increased compliance of the adhesive layer may be provided by use of a patterned adhesive, as is shown in FIG. 11. Layer 1102 is alternating regions of adhesive having a height in the range of 10-25 microns, and regions of low adhesive wherein the adhesive thickness is less. The difference in height between the two regions may be the entire thickness of the adhesive, as shown in FIG. 11, or a smaller thickness, but is preferably at least 5 microns. The pattern of the adhesive should be such as not to introduce a printing artifact, since the density of color that is printed onto the color-forming composition may depend upon the thermal conductivity of underlying layers. Preferably, also, the pattern is such as not to introduce Moire patterns. As is known in the art, such patterns of adhesive may be prepared by applying a coating of an adhesive composition on an embossed liner, and then removing the liner.

In a preferred embodiment of the invention, there is provided an adhesive layer comprising a pattern of regions of a first thickness and regions of a second thickness, the first thickness being at least 5 microns less than the second thickness, and the first thickness being in the range of 0-25 micrometers.

Figure 12:
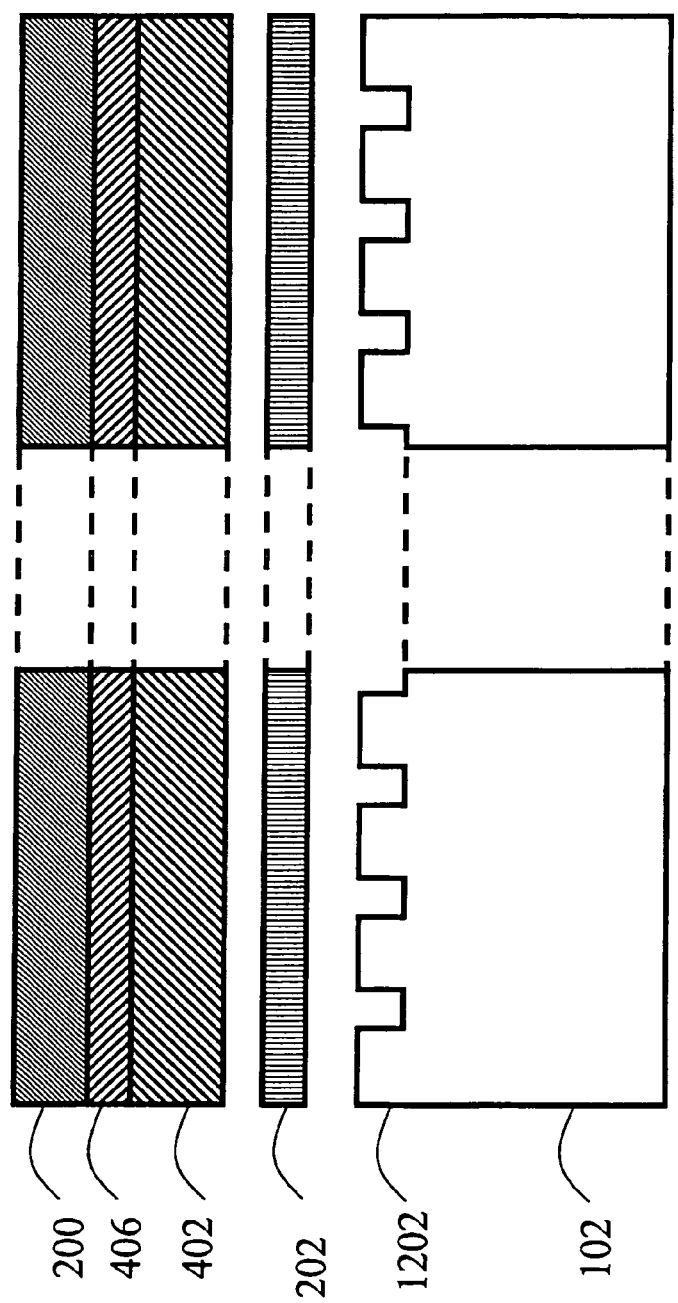

Alternatively, as is shown in FIG. 12, a pattern 1202 may be embossed into the surface of disc 102 to which adhesive layer 202 is applied. The depth of such an embossed pattern may be only on the order of 1 micrometer. Preferably the pattern is on a scale much smaller than the dimension of a pixel of the image (i.e., less than about 85 micrometers; preferably 40 microns or less) so that minimal imaging artifacts are generated by the differential thermal conductivity that will arise from air pockets within the embossed pattern when a uniform adhesive layer 202 is applied over it.

When substrate 402 itself is too rigid to provide compliance, an optional compliant layer 406 may be provided separating color-forming composition 200 from the substrate 402. Such a compliant layer may comprise a rubbery polymeric material, such as a latex, for example, or an air-voided material.

It is possible that imaging artifacts may be introduced by variations in the thickness of the optical disc 102 itself. Typically, CD and DVD optical discs comprise a raised ring around the central hole that prevents scratching of the optical surface when discs are stacked. In the region of this "stacking ring" the polycarbonate thickness is greater than in the periphery of the disc, and the thermal capacity correspondingly greater. In addition, the distance that heat may diffuse through the polycarbonate disc to a platen or air interface is greater in the region of the stacking ring. These differences in thermal properties may affect the density of a thermally-printed image. To alleviate this problem, adhesive 202 and substrate 402 should be chosen so as to have the lowest possible thermal conductivity.

One method of the present invention to compensate for predictable changes in the density of the thermally-printed image (such as changes that may be induced by the stacking ring) is to adjust the data that is to be printed correspondingly, similarly to the compensation made in thermal printing for thermal history. To enable such a change to be made in a less noticeable manner, it is preferred that the stacking ring have a smooth contour, and not constitute a step change in thickness of the disc.

It is also possible that in the region of the stacking ring the image content be chosen so that any distortion of the image not be objectionable. For example, a logo or band of constant color might be printed in the region of the stacking ring.

It is to be understood that although the invention has been described above in terms of particular embodiments, the foregoing embodiments are provided as illustrative only, and do not limit or define the scope of the invention.

The performance of a labeled optical disc of the invention will now be described further with respect to a specific preferred embodiment, it being understood that this is intended to be illustrative only and the invention is not limited to the materials, amounts, procedures and process parameters, etc. recited therein.

To a Blu-ray disc with a slight bias in radial tilt towards the data side was applied, sequentially, a transfer adhesive (3M 8171 Optically Clear Adhesive, a 1 mil thick acrylic pressure-sensitive adhesive, supplied between polyester release liners, pre-cut into an annulus of inner diameter 23 mm and outer diameter 115 mm), and a coating described above with reference to FIG. 7.

The radial tilt of the labeled disc was measured after assembly in a laboratory at 22° C. and 50% RH; after desiccation at 22° C. and <10% RH for 16 hours; and finally after storage in an environment of 22° C. and 75% RH for 1 day, giving results shown in Table 2:

TABLE 2

| Condition | Outer track average radial tilt | Outer track minimum radial tilt | Outer track maximum radial tilt |
|---|---|---|---|
| 22° C./50% RH | 0.194 | 0.108 | 0.297 |
| 22° C./<10% RH | 0.072 | −0.012 | 0.175 |
| 22° C./75% RH | 0.141 | 0.054 | 0.209 |

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. An optical data storage medium comprising:
   (A) a laminar plastic disc having first and second opposed surfaces, said plastic disc comprising at least one data-storing layer, and
   (B) a color-forming composition overlying said first surface, said color-forming composition comprising, in order of increasing distance from said first surface:
   (B)(1) a first color-forming layer;
   (B)(2) a first thermally-insulating layer;
   (B)(3) a second color-forming layer;
   (B)(4) a second thermally-insulating layer; and
   (B)(5) a third color-forming layer;
   wherein said color-forming layers are initially colorless and form a color when heated;
   wherein the color-forming temperature of said first color-forming layer is lower than the color-forming temperature of said second color-forming layer, and the color-forming temperature of said second color-forming layer is lower than the color-forming temperature of said third color-forming layer; and
   wherein the color forming composition is configured to maintain a change in radial tilt of said optical disc measured at any location of less than 0.6 degrees when the ambient humidity changes from 75% RH to 10% RH at a constant temperature between 20° C. and 30° C.

2. The optical disc of claim 1, wherein said color-forming composition is borne by a substrate of thickness between about 20 and 200 micrometers, and said substrate is bonded to said first surface by an adhesive.

3. The optical disc of claim 2, wherein said substrate is configured to change in size by less than 0.05% in any linear dimension when heated from 25° C. and 90° C.

4. The optical disc of claim 2, wherein said substrate comprises polycarbonate and has a thickness of less than about 65 micrometers.

5. The optical disc of claim 1 wherein the color forming composition is configured to maintain a change in radial tilt measured at any location of less than 0.3 degrees when the ambient humidity changes from 10% RH to 90% RH at a constant temperature between 20° C. and 30° C.

6. The optical disc of claim 1 wherein the color forming composition is configured to maintain a change in maximum radial tilt measured at any location in the range of 0-0.3 degrees towards said second surface at a relative humidity of at least 50% and a temperature of 20° C.

7. The optical disc of claim 1 wherein the color forming composition is configured to maintain a change in radial tilt measured at any location of less than 0.6 degrees when the temperature changes from 20° C. and 80° C. at a constant dew point.

8. The optical disc of claim 7 wherein the color forming composition is configured to maintain a change in radial tilt measured at any location of less than 0.3 degrees when the temperature changes from 20° C. and 80° C. at a constant dew point.

9. The optical disc of claim 1 wherein the stiffness that when measured by applying a force to a recumbent cylindrical probe of 2 millimeter radius in contact with the surface of said color-forming composition at a load of 0.4+/−0.04 Newtons per millimeter of contact, with a compression rate of 1 micrometer per second, is not more than 0.12 Newtons per millimeter of contact per micrometer of penetration when the second surface of the optical disc is rigidly supported.

10. The optical disc of claim 1 wherein the width of contact, measured in a direction perpendicular to its axis, when using a recumbent cylindrical probe of 2 millimeter radius pressed into contact with the surface of said color-forming composition with a load of 0.4+/−0.04 Newtons per millimeter of contact measured in the direction of the axis of said probe, with a compression rate of 1 micrometer per second, is at least 90 micrometers when the second surface of the optical disc is rigidly supported.

11. The optical disc of claim 1 wherein said first surface of said disc bears an embossed pattern of depth at least one micrometer.

12. The optical disc of claim 1 wherein said color-forming composition is borne by a substrate of thickness between about 20 and 200 micrometers, and said substrate is bonded to said first surface by an adhesive layer.

13. The optical disc of claim 12 wherein said adhesive layer comprises a pattern of regions of a first thickness and regions of a second thickness, said first thickness being at least five microns less than said second thickness, and said first thickness being in the range of between about 0 and 25 micrometers.

14. A method for manufacture of an optical disc with one thermally-printable surface, comprising the steps of: (A) providing a laminar plastic disc having first and second opposed surfaces, said plastic disc comprising at least one data-storing layer; (B) coating a thermally-printable composition onto a surface of a web having first and second opposed surfaces; (C) bonding the surface of said thermally-printable composition that is not in contact with said substrate to said first surface of said plastic disc; and (D) removing said substrate by peeling.

15. The method of claim 14 wherein said thermally-printable composition comprises: (1) a first color-forming layer; (2) a first thermally-insulating layer; (3) a second color-forming layer; (4) a second thermally-insulating layer; and (5) a third color-forming layer.

16. The optical disc of claim 12 wherein said adhesive layer comprises a pattern of regions of a first thickness and regions of a second thickness, said first thickness being at least five microns less than said second thickness, and said first thickness being in the range of between about 0 and 25 micrometers.

* * * * *